June 2, 1931.  R. T. OSMAN  1,808,251

DUMP BODY

Filed Nov. 8, 1928   2 Sheets-Sheet 1

Inventor
Ralph T. Osman
By Young & Young
Attorneys

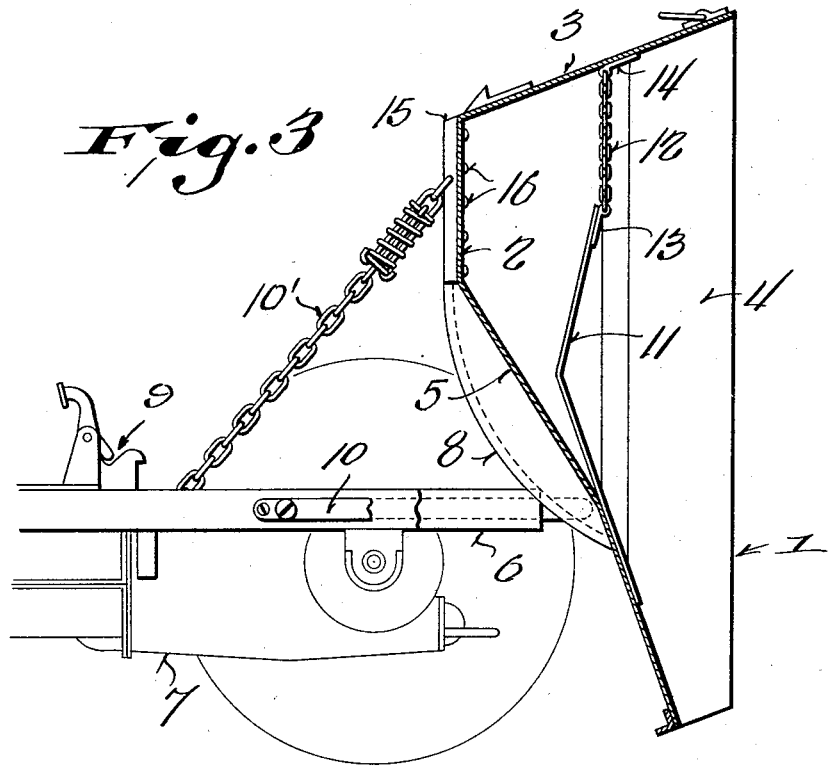
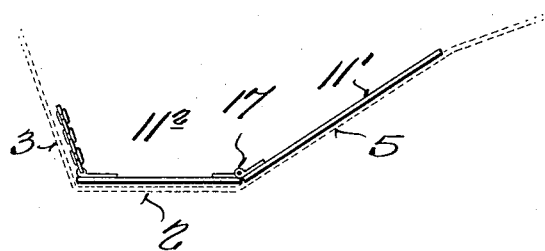

Patented June 2, 1931

1,808,251

UNITED STATES PATENT OFFICE

RALPH T. OSMAN, OF MANSFIELD, OHIO

DUMP BODY

Application filed November 8, 1928. Serial No. 317,962.

This invention pertains to improvements in dump bodies, and has primarily for its object to provide simple and efficient means, automatically actuated upon dumping of the body, to facilitate the discharge of material therefrom and to prevent the same from adhering in the corners thereof.

Incidental to the foregoing, a further object is to provide a dump body with a movable apron normally nested within the bottom of the body and adapted to automatically project itself as the body is tilted.

A further object is to provide an apron conforming to the contour of the bottom of the body and flexibly connected to the body, whereby it automatically assumes its normally nested position and projects itself upon tilting.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is a transverse section through a conventional type of dump body, with the present invention attached thereto, the same being taken on the line 1—1 of Figure 2;

Figure 3 is a view similar to Figure 1 showing the body in tilted position; and

Figure 4 is a detailed view illustrating a modification of the present invention.

Figure 1:
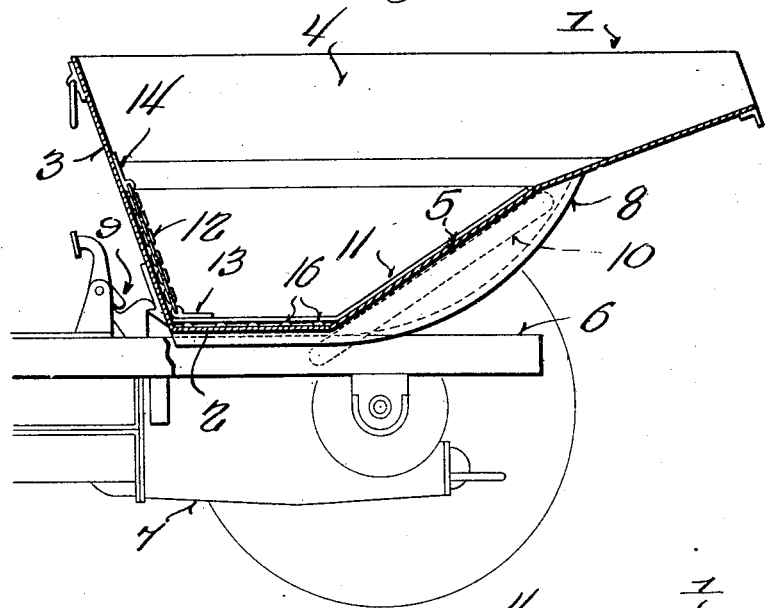
Figure 2:
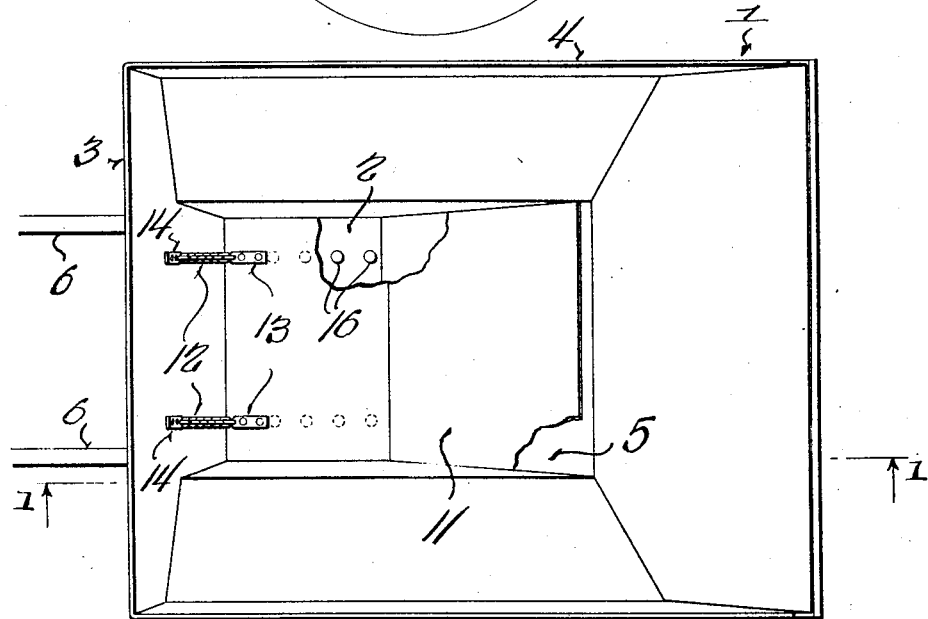
Figure 2 is a plan view with parts broken away.

Referring now more particularly to the accompanying drawings, the numeral 1 designates the conventional type of dump body comprising a bottom 2, a rear wall 3, and side walls 4. In the body illustrated, the forward portion of the bottom is inclined upwardly at 5 towards the forward discharge end of the body. Also, the side walls 4 are flared outwardly intermediate their height to facilitate mounting of the body upon a suitable frame and at the same time provide the desired capacity.

While the present invention may be attached to any type of dump body adapted to discharge material therefrom by tilting the same, that type illustrated is commonly termed a gravity dump, wherein the center of gravity, when filled with material, is slightly past the fulcrum point. Obviously, it is immaterial whether a body of this type is attached to a tractor, as illustrated, or positioned upon a frame of a truck, trailer, or other vehicle.

In the present instance, a pair of frame members 6 are provided which may be attached to the tractor 7 in any suitable manner. Secured to the bottom of the body 1 in alignment with the sills or frame members 6 are a pair of flanged rockers 8 which engage the sills and permit the body to dump upon release of the latching mechanism 9 carried by the frame members. Links 10 pivotally connected to the frames 6 and to the rockers 8 serve to prevent shifting of the body on the frames, while the chains 10' limit the tilting movement of the same. The foregoing structure is conventional and forms no part of the present invention other than in the combination as hereinafter claimed.

In dump bodies of the general type illustrated and described, considerable difficulty has been encountered in discharging the material therefrom upon tilting of the body, due to the fact that it has a tendency to adhere in the corners and to the sides of the body, particularly where the material is of a particularly fine grade, or should the same contain any moisture. Also, in order to discharge materials from bodies of this type, there is a tendency to deliver the bulk of the material at the center of the discharge end of the same, due to the tendency of the material to adhere to the sides and corners.

To overcome the foregoing, the present invention consists in the provision of an apron 11, preferably formed from sheet metal or other rigid material, and shaped to conform to any irregularities in the bottom of the body. In the present instance, where a portion of the bottom 2 is inclined upwardly, the apron is provided with an annular offset conforming to the same.

While any suitable connection may be employed between the apron 11 and the body, it has been found in practice that a flexible connection such as the chain 12 is more desirable in that it permits the apron to freely follow the material as the same is discharged upon tilting the body. The chains 12 are connected to brackets 13 secured to the rear end of the apron and to similar brackets 14 carried by the rear wall of the body intermediate its top and bottom. Thus, in the tilting operation, the apron will follow the material and assume a substantially vertical position, as disclosed in Figure 3. Obviously, in view of the fact that the apron is of substantially the same width as the restricted portion of the body, the same will carry material forward and prevent adhering of the same within the corners between the bottom and the sides. Further, as the body is tilted, the weight of the apron and the material contained thereon will cause the same to be projected forwardly, thus serving to scrape the forward inclined portion of the bottom and remove the material therefrom.

Inasmuch as the apron tends to discharge the material from the central portion of the body, the material positioned at the overhanging sides is free to follow the central bulk, thus resulting in an even distribution of material throughout the entire width of the discharge mouth of the body.

As best shown in Figure 3, the bottom 2 has secured thereto a pair of spaced angle irons 15 which are preferably attached by rivets 16, and serve to connect the retaining chains 10' to the body. The particular purpose of utilizing the rivets 16 to attach the angle irons 15 is to provide projections on the bottom 2 whereby the apron 11 in its normal nested position, is spaced slightly from the bottom. This spacing avoids any tendency of the apron to adhere to the bottom through suction or other causes.

While a rigid apron has been illustrated and described in some detail, it is also contemplated that the same may be hinged, as illustrated in Figure 4, wherein the forward portion 11' is hinged to the rear portion 11² by a hinge 17. This structure not only permits the apron to conform to the contour of the bottom of the body but also as the material is discharged, the apron can assume a vertical plane which permits its forward end to be projected further and also eliminates the corner, present in the rigid structure.

From the foregoing, it will be obvious that a very simple, efficient, and inexpensive device has been provided to facilitate the discharge of material from dump bodies and prevent the adhering of material at the sides and corners of the body.

I claim:

In combination with a dump body having side walls and a bottom provided with an upwardly inclined portion, said side walls being restricted at their lower ends, a metallic apron normally resting upon said bottom and conforming to the same, means for spacing said apron from the bottom of said body, and a chain connecting the rear end of said apron to the rear wall of said body at a point intermediate its top and bottom.

In testimony that I claim the foregoing I have hereunto set my hand at Mansfield, in the county of Richland and State of Ohio.

RALPH T. OSMAN.